United States Patent [19]

Steck, III

[11] Patent Number: 5,690,369
[45] Date of Patent: Nov. 25, 1997

[54] FISHERMAN'S KNOT TYING DEVICE

[75] Inventor: William F. Steck, III, Stamford, Conn.

[73] Assignee: Outdoor Scientific, Inc., Stamford, Conn.

[21] Appl. No.: 782,748

[22] Filed: Jan. 13, 1997

[51] Int. Cl.$^6$ .................................................. B65H 69/04
[52] U.S. Cl. ................................................................ 289/17
[58] Field of Search ............................. 289/2, 5, 15, 17, 289/18.1, 1.5

[56] References Cited

U.S. PATENT DOCUMENTS

| | | | |
|---|---|---|---|
| 1,452,906 | 4/1923 | Butler et al. | 289/17 |
| 1,481,754 | 1/1924 | Stalson . | |
| 2,469,037 | 5/1949 | Harvey | 289/17 |
| 2,488,414 | 11/1949 | King | 28/72 |
| 2,498,920 | 2/1950 | Holland | 289/17 |
| 2,502,751 | 4/1950 | Roberts | 289/17 |
| 2,773,713 | 12/1956 | Smalley | 289/17 |
| 3,606,405 | 9/1971 | Lally | 289/17 |
| 3,713,680 | 1/1973 | Pagano | 289/17 |
| 3,787,081 | 1/1974 | Macy | 289/17 |
| 3,873,140 | 3/1975 | Bloch | 289/17 |
| 4,400,025 | 8/1983 | Dennison | 289/17 |
| 5,240,295 | 8/1993 | Spencer | 289/1.5 |

FOREIGN PATENT DOCUMENTS 1037361 8/1958 Germany .

*Primary Examiner*—Michael A. Neas

[57] ABSTRACT

A hand-held knot-tying device used for forming fishermen's knots, such as blood knots, which are used to tie two fishing lines segments together. The device is flat with a base from which two spaced-apart legs extend at right angles. The device may be formed from an assembly consisting of congruent plates which are fastened together adjacently. The assembly also includes a medial member. The spaced apart legs of the assembly provide two sets of two nips into which the fishing line is wedged and held fast. The top portion of each nip is tapered so as to facilitate insertion of the fishing line segments. The medial member is manipulated on the device so as to form two sets of coils in the line segments on either side of the medial member. Following the aforesaid line manipulation, free ends of the line segments are clamped to the medial member which is then pulled through a loop formed between the coils so as to form a loose knot. The line segments are then pulled in opposite direction to tighten the knot while the free ends remain clamped in the medial member.

12 Claims, 4 Drawing Sheets

5,690,369

FISHERMAN'S KNOT TYING DEVICE

TECHNICAL FIELD

This invention is a device for manually tying fisherman's knots, such as the blood knot. The blood knot, because of its special attributes, is the knot preferred by fishermen for tying together segments of monofilament line. It is small, strong, and renders alignment between the two monofilament segments being tied together. However, the blood knot is difficult to tie with only the use of ones hands.

BACKGROUND ART

Two common situations require the use of blood knots. The first is in the construction of leaders. Leaders are relatively short, free lengths of line that are tied to the end of the much longer, thicker principal line that is wound around a fishing reel. Leaders are used because they are very free and hence much more difficult for fish to see than the thicker principal line. Typically leaders comprise several monofilament segments of different diameter tied together in a sequence that produces a taper. A common example of a leader would be one nine feet long comprising a 0.020 inch diameter segment of monofilament at the thick end, a 0.004 inch segment at the fine end, and four or five intervening segments of different diameter. Fishermen often make a supply of several leaders before fishing season. Thus, one occasion on which blood knots are used is before the fisherman begins to fish.

A second common situation requiring the use of blood knots is while the fisherman is on a stream and the end of the leader currently in use becomes snarled, or otherwise damaged, in which case the fisherman cuts off the spoiled end and replaces it with a new segment of monofilament. This is difficult to do while out on the stream. Fine diameter monofilament is a challenge to manage while seated at a table with the aid of clamps, but when one is at the side of a stream, or standing in a stream, or toward dark when it is difficult to see, the assistance of a blood knot tying device could be deemed essential.

Blood knot tying devices exist in the prior art, but many of the prior devices are too complex and would be costly to manufacture. Others of the prior art, while not complex, would simply be difficult to use.

U.S. Pat. No. 4,400,025, granted to R. R. Dennison describes a leader tying vise device which is currently being marketed through sporting goods stores and by mail order. The Dennison device has several drawbacks, which are as follows: First, the device has spaced-apart clamps each of which holds both monofilament segments being tied together adjacently. Thus, when one segment is freed from its clamped position, as necessary during the tying process, the other segment might unintentionally comes loose as well.

Another drawback of the aforementioned patent is that the tying process requires the fisherman to separate adjacent monofilament segments with the point of what is referred to in the patent as the "tool". This can be difficult with or without 20/20 vision and in any case toward dawn or dusk. Another drawback occurs after twisting the monofilament segments around each other with the "tool", as required when using the Dennison device, because the "tool" must be held by hand while the free end of one monofilament segment is threaded through the loop formed by the twist. Following this, the end just threaded through the loop has to be held by hand while the other free end is also threaded through the loop formed by the twist. Then both ends just threaded through the loop must be held by hand while the knot is drawn tight. While the aforementioned free ends could be clamped into the device's lever mechanism as an alternative to holding them, that alternative would risk setting loose the other ends of the monofilament being held by the device's clamping mechanism. This could undo the whole process. The procedures required by the Dennison device become more and more difficult as the monofilament segments being tied together decrease in diameter, because as monofilament decrease in diameter it become increasing more and more limp and increasingly more difficult to manage.

It would be desirable to provide a knot-tying device which is easier to use and not prone to the difficulties described above.

DISCLOSURE OF THE INVENTION

This device relates to a device which is simple to manufacture; is effective in tying a blood knot; and is easy to use. The ease of manufacture of the device is due to the fact that it comprises two simple assemblies. The first assembly is a sandwich of flat plates, which in the preferred embodiment, are fastened together by sleeves made from inexpensive shrink plastic tubing which is readily available from industrial suppliers. The two outer plates are identical and are fabricated by stamping them out of readily available metal stock. The inner plate is preferably injection molded. The second assembly is an arbor comprising a metal sleeve into which a plurality of tapered pins is pressed and held firmly. The device will not deteriorate with time or normal environmental exposure. It is easy to use and does not require unusual dexterity to produce perfect knots, even under "standing-in-stream" conditions.

It is therefore the object of this invention to provide an improved blood knot tying device.

These and other objects and advantages of this invention will become more apparent from the drawings herein and the detailed description of the preferred embodiment.

DETAILED DESCRIPTION OF THE INVENTION

Figure 1:
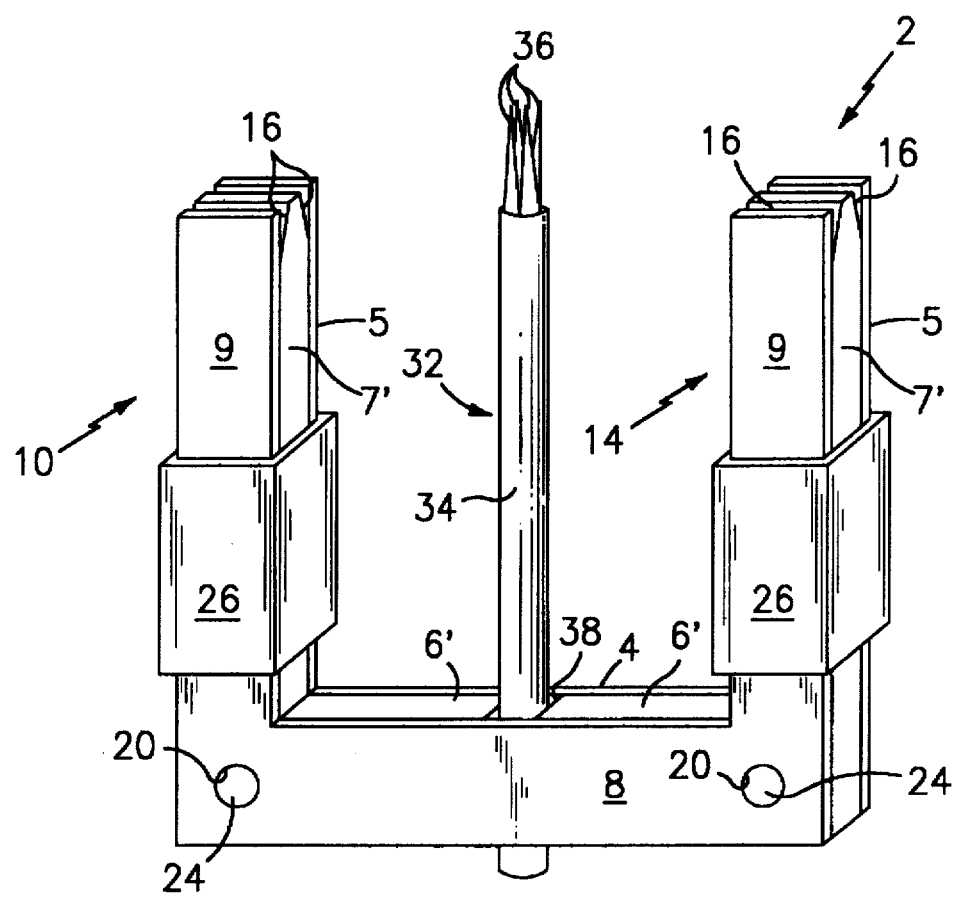
FIG. 1 is a perspective view of the preferred embodiment of a blood knot tying device made in accordance with this invention.

Referring now to FIG. 1, the preferred embodiment of this invention is shown. It is denoted generally by the numeral 2. The device consists of two outer plates 4 and 8 and a pair of inner plates 6'. Plates 4 and 8 are identical, and include two flat legs 5 and 9, and are made of relatively thin but stiff material such as 0.025 inch spring tempered stainless steel. The size of this device is preferably approximately two inches long and two inches high. The plates 6' include legs 7'. The plates 6' do not require the stiffness of the plates 4 and 8 and are preferably, but not necessarily, constructed of plastic, such as polycarbonate. The device 2 has two legs 10 and 14. The legs 7' on the center plates 6' are tapered or rounded on both sides of their free ends, as at 16, so as to facilitate the insertion of the monofilament segments into the device during the knot-tying process, as will be shown in detail subsequently. The extra thickness of the plates 6' provides a larger area of tapered surface 16, thus further facilitating the insertion of the monofilament segments. The plates 4 and 8 are slightly bowed in the manufacturing process so as to create a permanent bias operable to urge the free ends 5 and 9 against plate legs 7', once the device 2 is assembled. This creates an operative spring-like clamping action between the plate legs 5, 7' and 9, which is necessary to the proper functioning of device 2.

Figure 2:
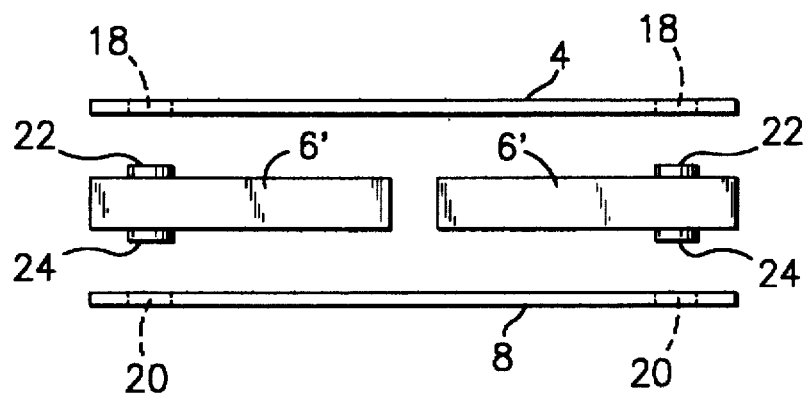
FIG. 2 is a bottom view of the three plate components of the device prior to assembly.

The plates 4 and 8 are fabricated with identically located holes 18 and 20 respectively. The plates 6', as shown in FIG. 2, are fabricated with posts 22 and 24 which are aligned with holes 18 and 20 respectively. Thus the posts 22 fit into holes 18, and the posts 24 fit into the holes 20 thereby holding plates 4, 6' and 8 in proper alignment. The three plates 4, 6', and 8 are preferably fastened together by rigid, inelastic shrink plastic sleeves 26 fitted onto legs 10 and 14. The inelastic characteristic of the shrink plastic gives full effect to the aforementioned spring action of the outer plates 4 and 8. The aforementioned alignment method assures not only the proper mating of parts after assembly, but also serves to hold plates 4, 6' and 8 in place while the plastic sleeves are being shrunk tightly around the plates during assembly. This method of alignment avoids the expense of an assembly fixture to perform the alignment function.

The device 2 also includes a central member 32 which comprises an outer sleeve 34 into which a plurality of pins 36 are pressed. The pins 36 are tapered or rounded in the manufacturing process to facilitate insertion of monofilament segments between the pins 36 during the knot tying process, as will be shown in detail subsequently. The central member 32 is frictionally held in passage 38 that is defined by the plates 4, 8, and 6'. The central member 32 can be intentionally moved up and down in the passage 38, but will be frictionally resisted from unintentional movement by spring pressure of the plates 4 and 8 against the central member 32. Spring pressure against central member 32 is given effect by fabricating plates 6' to a lesser diameter than the central member 32. Thus, at the point of the passage 38, the plates 4 and 8 engage the central member 32 when it is in place without touching the plates 6'. The manner in which the central member 32 is used in the formation of a blood knot will be discussed in detail subsequently.

Figure 3:
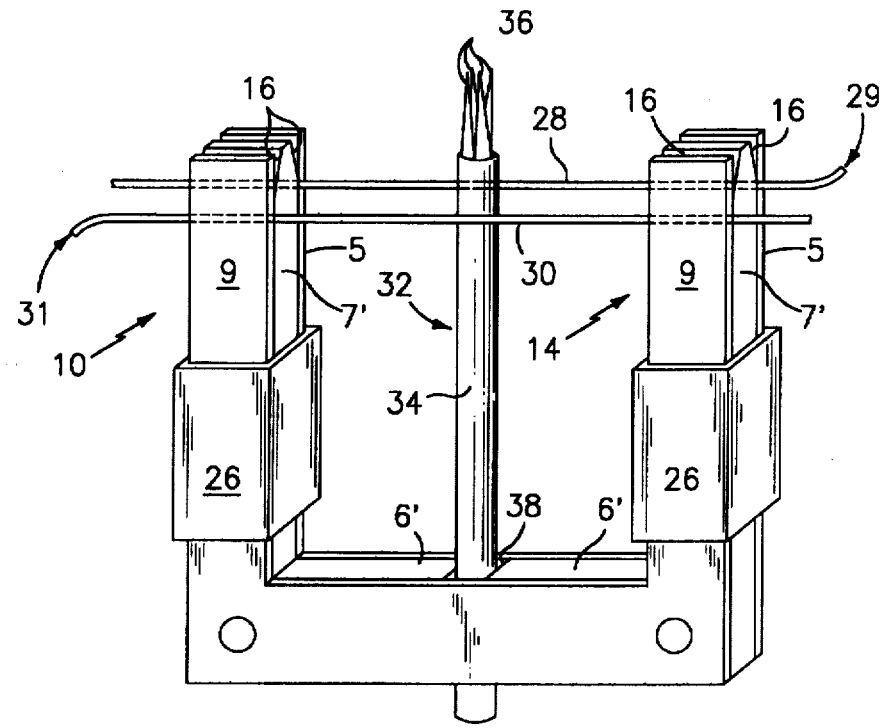
FIG. 3 illustrates two monofilament segments clamped in position, ready to be tied together.

FIG. 3-6 illustrate the manner in which monofilament segments 28 and 30 are manipulated in device 2 to form a blood knot. It will be understood that the numeral 29 refers to the free end of the monofilament segment 28 and that the numeral 31 refers to the free end of monofilament segment 30. FIG. 3 illustrates the segments 28 and 30 positioned in the device 2 in the ready-to-tie position. More specifically, the segment 28 is clamped between the plate legs 5 and 7' of the device 2 legs 10 and 14 having skirted to the rear of central member 32, and the segment 30 is clamped between the plate legs 9 and 7' of the device 2 legs 10 and 14 having skirted to the front of central member 32. It will be noted that the segments 28 and 30 now straddle central member 32.

Figure 4:
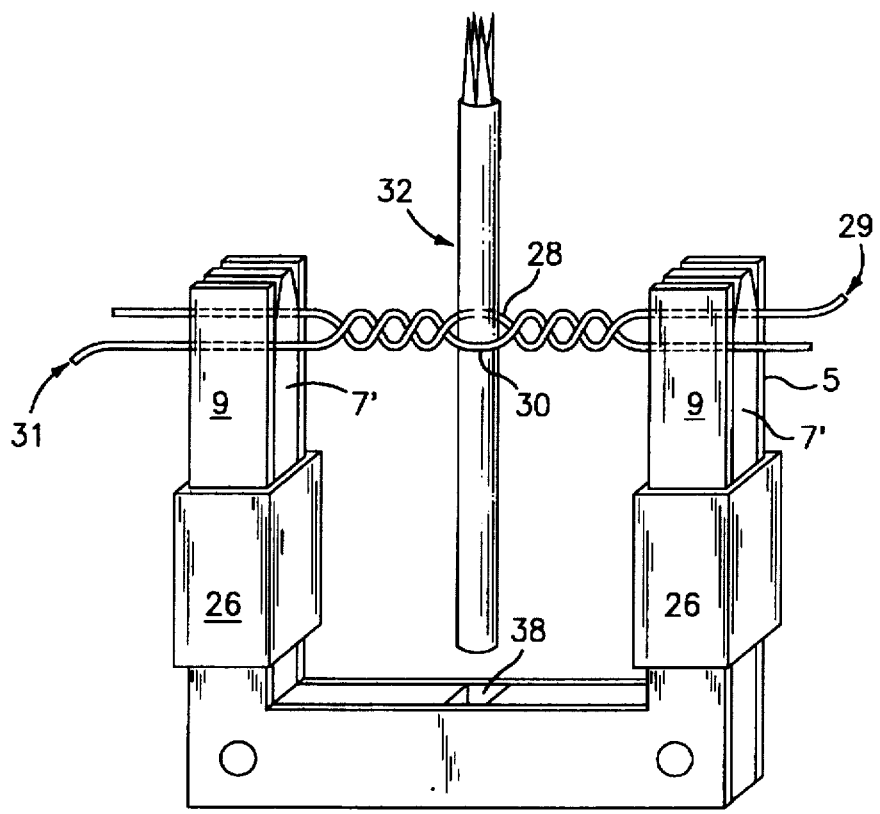
FIG. 4–6 illustrates the manner in which the monofilament segments are manipulated in the device to form a blood knot.

FIG. 4 illustrates how the central member 32 is lifted out of passage 38 and is rotated in either direction so as to twist the monofilament segments 28 and 30 around each other. During the twisting operation, the monofilament segments 28 and 30 remain clamped in their aforementioned ready-to-tie position.

Figure 5:
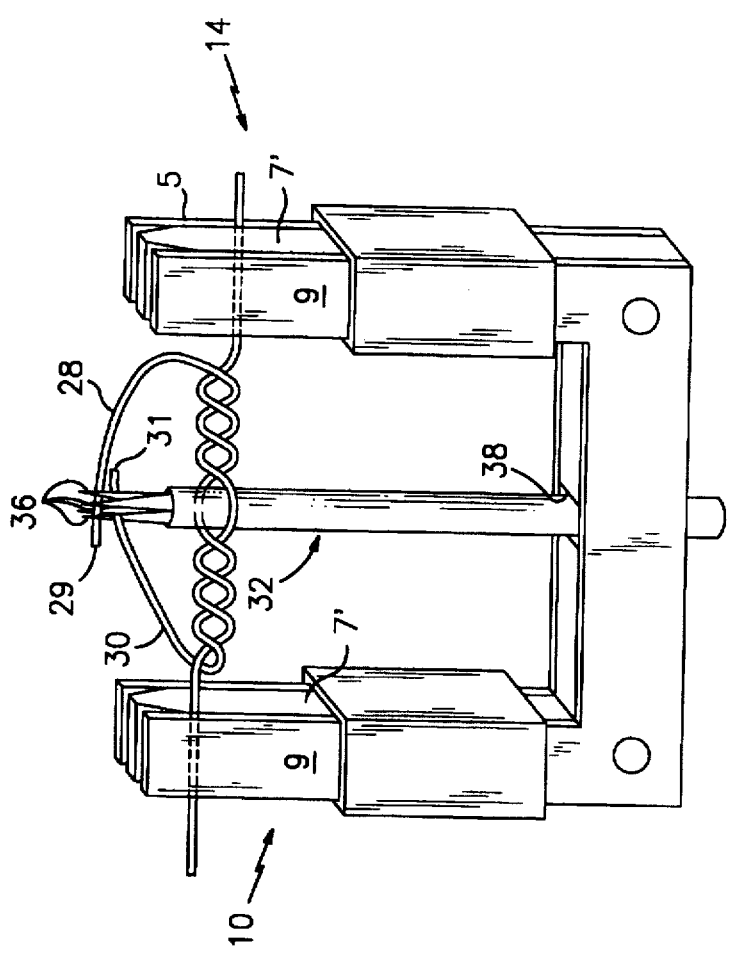

FIG. 5 illustrates that the central member 32 is reinserted into passage 38 while still retaining its position in the loop formed by the twist; and the free ends 29 and 31 of the monofilament segments 28 and 30 are released from their initial position in legs 10 and 14 of the device 2, and are wedged between the pins 36 in the central member 32. The monofilament segment 28 is wedged between the pins 36 in one directional path and the monofilament segment 30 is wedged between the pins 36 in the directional path ninety degree from the directional path of the monofilament segment 28. This exploits the uniqueness of the clamping mechanism of the plurality of the pin 36. More specifically, though there are only a total of four pins in the preferred embodiment, the monofilament segment 28 is clamped by full contact of all four pins, while simultaneously the monofilament segment 30 is also clamped by full contact of all four pins. This is so even if monofilament segment of completely different diameter are being tied together. Were an ordinary clamping means used, only the larger monofilament segment would hold tight.

Figure 6:
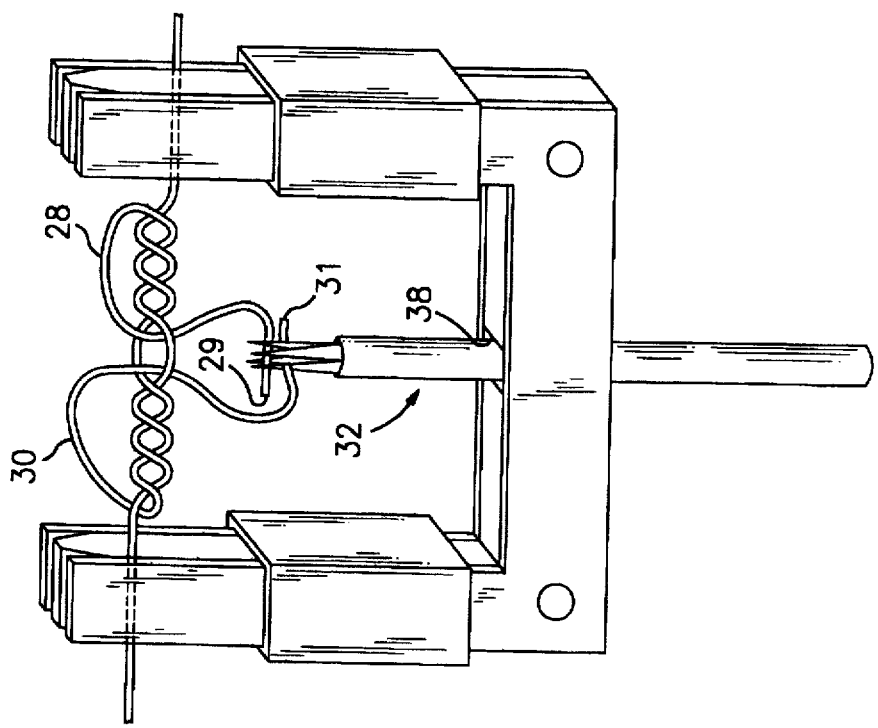
Figure 7:
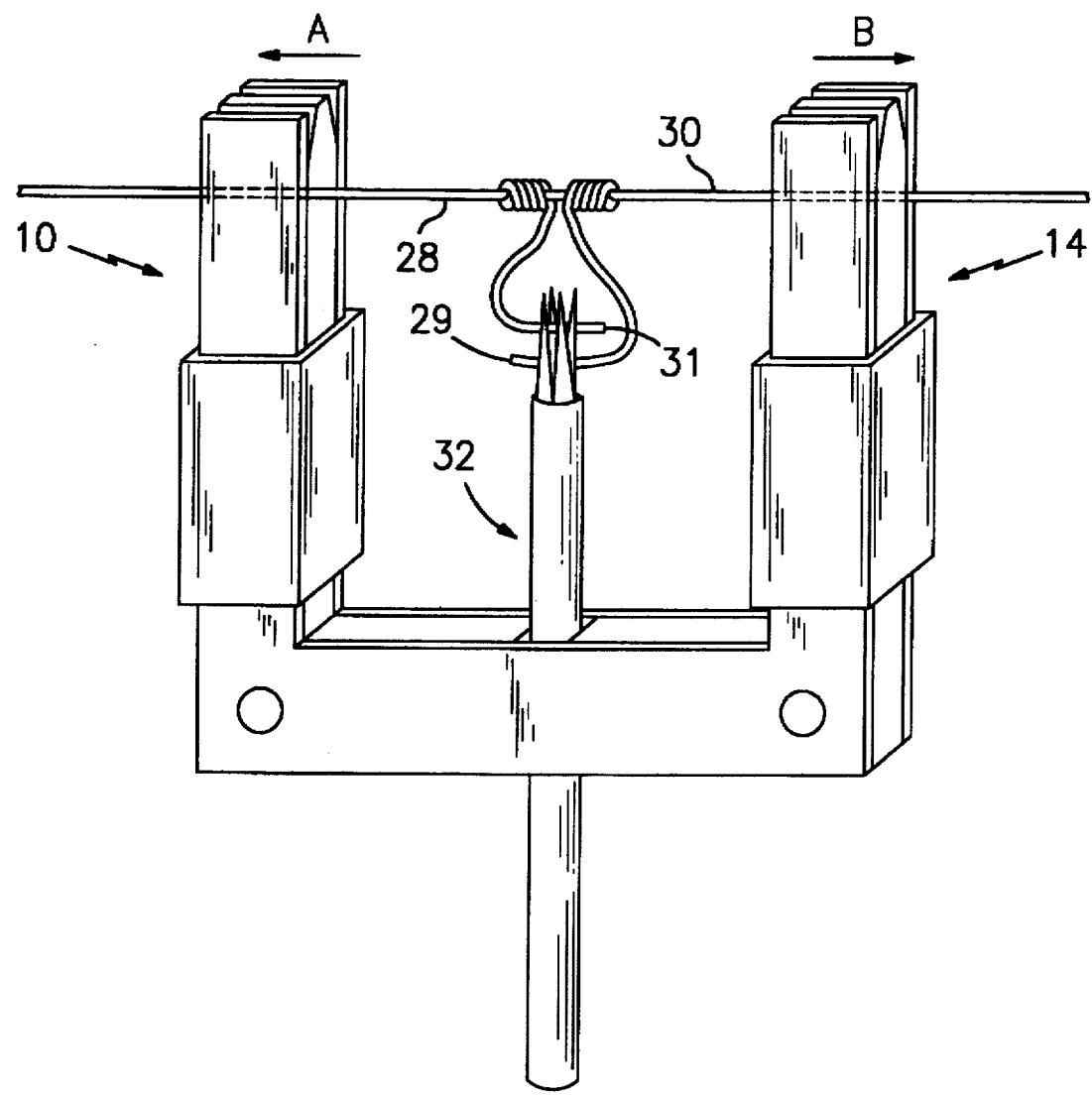
FIG. 7 illustrates the manner in which the knot is tightened.

Subsequently, as shown by FIG. 6, the free ends 29 and 31 of the monofilament segments 28 and 30 are pulled downward through the loop formed by the twisting of monofilament segments 28 and 30 by moving the central member 32 downward in the passage 38. This manipulation completes the formation of a loose blood knot. Thereafter, as shown by FIG. 7, monofilament segments 28 and 30 are pulled in opposite directions, as indicated by arrows A and B, while the free ends 29 and 31 of segments 28 and 30 remain capture by pins 36 of central member 32 of the device 2. This manipulation tightens the blood knot. The free ends 29 and 31 are then pulled free from central member 32 and snipped to the desired length, thus completing the knot.

It will be readily appreciated that the device of this invention is rugged and durable and simple to manufacture. The outer plates are stamped out of sheet metal, the shrink tubing is readily available from industrial suppliers, the inner plate is easily made by injection molding techniques, the sleeve of the central member is a rod with a hole in its center, and the pins are cutoff tapestry needles. The device is easy to use at home or in the field and does not require difficult manual operations to tie blood knots.

It must be noted that the central member 32, as disclosed, could be used with the Dennison device, U.S. Pat. No. 4,400,025, in lieu the "tool" which that patent specifies. By such substitution the central member 32 the monofilament segments being tied together could kept separate beginning with the ready-to-tie position thus making it unnecessary to separate the segments with the pointed end of the "tool". Further the central member 32 would eliminate having to thread the free ends of monofilament through the loop formed by the twist, and finally, it would hold the free ends fast and thus eliminate the inconvenience of their coming loose.

Since many change and variations of the disclosed embodiments of the invention may be made without departing from the inventive concept, it is not intended to limit the invention otherwise than as required by the appended claims.

What is claimed is:

1. A device for tying together separate segments of monofilament or similarity fine line with a fisherman's knot such as a blood knot, said device comprising:

a) two like configured outer plates, each of said outer plates including a basal part and two leg parts extending from said basal part at right angles thereto;

b) an inner plate sandwiched between said outer plates, said inner plate having a basal portion interposed between the basal parts of said outer plates, and said inner plate having leg portions extending from said basal portion at right angles thereto and being sandwiched between said leg parts of said outer plates, said inner plate leg portions combining with said outer plate leg parts to form spaced-apart clamps for clamping one of the separate segments of line between the legs parts of one outer plate and the leg portions of one side of the inner plate, and for clamping the other segment of line between the leg parts of the other outer plate and the leg portions of the opposite side of the inner plate; and c) mechanical means connected to the basal area of said device, said mechanical means being operable to clamp in place the free ends of each line segment during the formation of a knot in the device.

2. The device of claim 1 wherein at least one surface at the tangency of inner leg portions and outer leg parts has a tapered free end to facilitate inserting the line segments into said spaced-apart clamps.

3. The device of claim 1 wherein inter-plate alignment is achieved by cylindrical protrusions disposed on opposite sides of said inner plate, which protrusions extend into corresponding openings of said outer plates, said cylindrical protrusions and openings mating upon assembly of the device.

4. The device of claim 1 wherein assembly of said plates is achieved by fastening means sufficiently rigid to hold firm said plates and thereby make operative spring clamping action between said outer plate leg parts and said inner plate leg portions.

5. The device of claim 4 wherein said fastening means comprises sleeves of inelastic shrinkable plastic.

6. The device of claim 1 wherein said mechanical means comprises a hollow rod sandwiched between said outer plates and slidably movable therebetween, said hollow rod containing a plurality of clamp forming bodies projecting from one end of said hollow rod.

7. A device for tying together separate segments of monofilament or similarity fine line with a fisherman's knot such as a blood knot, said device comprising:

a) two like configured outer plates, each of said outer plates including a basal part and two leg parts extending from said basal part at right angles thereto;

b) an inner plate sandwiched between said outer plates, said inner plate having a basal portion interposed between the basal parts of said outer plates, and said inner plate having leg portions extending from said basal portion at right angles thereto and being sandwiched between said leg parts of said outer plates, said inner plate leg portions combining with said outer plate leg parts to form spaced-apart clamps for clamping one of the two segments of line between the legs parts of one outer plate and the leg portions of one side the inner plate, and correspondingly for clamping the other segment of line between the leg parts of the other outer plate and the leg portions of the opposite side of the inner plate; and c) a hollow rod sandwiched between said outer plates and slidably movable therebetween, said hollow rod containing a plurality of clamp-forming bodies projecting from one end of hollow rod, said clamp-forming bodies being operable to clamp free ends of the line segments during formation of a knot.

8. The device of claim 7 wherein said clamp-forming bodies are a plurality of needleshaped members.

9. The device of claim 8 wherein there are four needle-shaped members in said hollow rod.

10. The device of claim 7 wherein there are two inner plates, and said hollow rod is contained in a passage formed by said outer plates and said inner plates.

11. The device of claim 10 wherein movement of said hollow rod in said passage is frictionally resisted.

12. A device for tying together separate segments of monofilament or similarity fine line with a fisherman's knot such as a blood knot, said device comprising:

a) a pair of spaced-apart clamps for clamping the two segments of line in parallel alignment with each other; and b) a hollow rod interposed between said spaced-apart clamps and movable between the clamped line segments, said hollow rod containing a plurality of needle-shaped clamp-forming bodies projecting from one end of said hollow rod, said clamp forming bodies being operable to clamp free ends of the line segments during the formation of a knot.

* * * * *